United States Patent [19]

Kobayashi et al.

[11] Patent Number: 4,557,761
[45] Date of Patent: Dec. 10, 1985

[54] RECORDING LIQUID

[75] Inventors: Masatsune Kobayashi, Yokohama; Tsuyoshi Eida, Ichikawa; Shoji Koike; Yasumasa Yokoyama, both of Yokohama; Tomoko Komori, Machida, all of Japan

[73] Assignee: Canon Kabushiki Kaisha, Tokyo, Japan

[21] Appl. No.: 552,794

[22] Filed: Nov. 17, 1983

[30] Foreign Application Priority Data

Dec. 1, 1982 [JP] Japan .................. 57-210906
Dec. 1, 1982 [JP] Japan .................. 57-210907

[51] Int. Cl.$^4$ ........................... C09D 11/02
[52] U.S. Cl. .................. 106/22; 260/DIG. 38
[58] Field of Search .............. 106/22; 260/DIG. 38

[56] References Cited

U.S. PATENT DOCUMENTS 4,197,135  4/1980  Bailey et al. ................ 106/22

OTHER PUBLICATIONS

*Chemical Abstract*, vol. 71, No. 3, Abstract No. 11,83v. De Rudder Jack et al., "Identification of Synthetic Water Soluble Dye," 1967.

*Primary Examiner*—Paul Lieberman
*Assistant Examiner*—Amelia B. Yarbrough
*Attorney, Agent, or Firm*—Fitzpatrick, Cella, Harper & Scinto

[57] ABSTRACT

A recording liquid comprising coloring matter, which is an image-forming component, and a liquid medium for dissolving or dispersing the coloring matter, the recording liquid being characterized by containing at least one of the dyes represented by the following general formula (A), as an image-forming component, $$Q^1-N=N-Q^2-N=N-Q^3 \quad (A)$$

wherein $Q^1$ and $Q^3$ each represent a substituted phenyl or naphthyl group having at least one SO$_3$M substituent and $Q^2$ represents a substituted naphthyl group having at least one SO$_3$M substituent, M being a base selected from Na, K, Li, NH$_4$, and amine salt cations.

A recording liquid comprising coloring matter, which is an image-forming component, and a liquid medium for dissolving or dispersing the coloring matter, the recording liquid being characterized by containing at least one of the dyes represented by the following general formula (B), as an image-forming component,

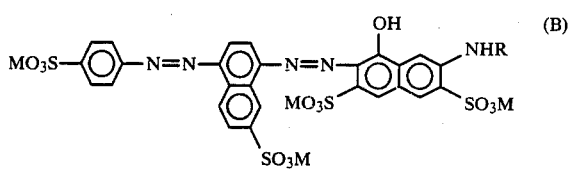

wherein; R represents one member selected from the group consisting —COCH$_3$,

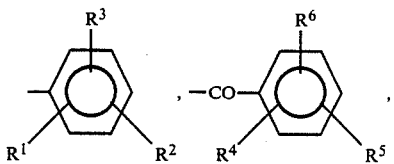

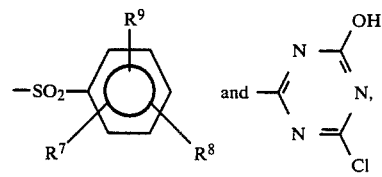

R$^7$, R$^8$ and R$^9$ each being a member selected from the group consisting of H, CH$_3$, C$_2$H$_5$, Cl, NH$_2$, OH and OCH$_3$; and M represents a base selected from Na, K, Li, NH$_4$, and amine salt cations.

2 Claims, 5 Drawing Figures

RECORDING LIQUID

BACKGROUND OF THE INVENTION

1. Field of the Invention

This invention relates to a novel recording liquid and is particularly directed to a novel recording liquid suitable for use in a recording system which comprises ejecting recording liquid droplets through fine spouts (discharging orifices) from a recording head to accomplish recording.

2. Description of the Prior Art

For recording on media such as paper and the like with writing tools (fountain pen, felt pen, etc.), there have hitherto been used inks, which are solutions of various dyes in water or in organic solvent.

It is also known that recording liquids of similar compositions are used in the above so-called ink-jet recording systems, in which the ejection of recording liquids is effected by vibration of piezo oscillators, electrostatic attraction due to a high voltage applied, or some other action. However, the recording liquids for the ink-jet recording system is required to satisfy more regorous performance characteristics in comparison with the recording liquids for writing tools such as fountain pen and felt pen.

There are various types of ink-jet recording systems which are different in the methods of generating recording liquid droplets and of controlling the flying directions of the droplets.

An example thereof is illustrated referring to FIG. 1. The device of FIG. 1 is a recording unit which generates recording liquid droplets in response to signals applied to a piezo oscillator attached to a recording head. In FIG. 1, 1 is the recording head provided with a piezo oscillator 2a, vibrating plate 2b, inlet port 3 for the recording liquid, liquid-holding chamber 4, and discharging orifice 5. The recording liquid 7 is fed into the liquid-holding chamber 4 from a reservoir 6 through a feeding pipe 8. An intermediate treating means 9 such as a pump or filter is provided, if necessary, in the middle of the feeding pipe 8. Recording signals converted into pulsed signals by use of a signal-treating means 10 (e.g. a pulse-generating means) are applied to the piezo oscillator 2a to vary the pressure of the recording liquid in the liquid-holding chamber 4 according to the applied signals. In consequence, the recording liquid 7 is discharged in the form of droplets 11 through the orifice 5 to make a record on the surface of a recording medium 12.

Besides the above, various types of devices are known; for example, a modification of the device of FIG. 1 is known which has, as shown in FIG. 2, a liquid-holding chamber 4 in a nozzle form and a cylindrical piezo oscillator 2a around the chamber. The mechanism of generating droplets in this device is fundamentally the same as in the device of FIG. 1. According to another known device, electrically charged droplets of recording liquid are continuously produced and parts of the droplets are used for recording. In another known device, thermal energy corresponding to recording signals is applied to the recording liquid in the recording head to produce droplets of the recording liquid.

An example of the device utilizing thermal energy is illustrated referring to FIGS. 3A, 3B and 4. FIG. 3A is a cross-section view of a recording head 13 taken in the direction of ink flow and FIG. 3B is the cross-sectional view taken on line A–B of FIG. 3A.

The recording head 13 is made by bonding a glass, ceramic or plastic plate having an ink-passing channel 14 with a heating head 15 for the thermosensitive recording (it is shown in the form of thin films in the figures but is not limited to such a form) which serves to exert thermal energy to the ink. The heating head comprises a protecting film 16 made of, e.g. silicon oxide; aluminum electrodes 17-1 and 17-2; a heating resistor layer 18 made of, e.g. nichrome; a heat accumulating layer 19; and a substrate 20 made of, e.g. alumina having a good heat-releasing property.

The ink 21 is filled in the channel 14 up to its discharging orifice 22 and forms a meniscus there by the action of pressure P.

On applying an electric signal to the electrodes 17-1 and 17-2, the region represented by n of the heating head 15 rapidly generates heat, bubbles are formed in the ink 21 contacting with the region n, the meniscus of the ink is projected by the action of the resulting pressure, and an ink droplet 24 is discharged through the orifice 22 and flys toward a recording medium 25. FIG. 4 shows an external appearance of a multi-head, which is an array of such heads as shown in FIG. 1. The multi-head is made by bonding a glass plate 27 having a number of channel 26 with a heating heat 28 similar to the one illustrated in FIG. 3A.

The recording liquid used for ink-jet recording is basically composed of coloring matter (a dye or pigments) and a liquid medium (water, various organic solvents and mixtures thereof can be employed) for dissolving or dispersing it, and if necessary, contains some additives. Recording liquids of this type have been disclosed in, for example, Japanese Patent. Publication Nos. 8361/1975, 40484/1976, 13126/1977 and 13127/1977 and Japanese Patent Laid-Open No. 95008/1975.

For the ink-jet recording liquid, more strict performance characteristics are requested than for the general writing ink. Such requested performance characteristics are as follows:

(1) Physical properties of recording liquid such as viscosity, surface tension and electric conductivity are to meet discharge conditions (e.g. piezo element-driving voltage and frequency; size, shape and material of orifice).

(2) It is stable during a long-term storage without causing orifice clogging.

(3) It is quickly fixed onto recording media such as paper, film and the like, the outlines of the resulting ink dots are smooth, and blotting of the dotted ink is minimized.

(4) The color of the resulting image is clear and dense.

(5) The resulting image is excellent in wet fastness and light fastness.

(6) It does not attack any of materials (its container, connecting tubes, sealants, etc.) in contact therewith.

(7) It has no unpleasant smell, toxicity, inflammability, or the like.

It is very difficult for the recording liquid to secure the above characteristics at the same time. The above-cited recording liquids of the prior art are unsatisfactory in this point.

Characteristics of the recording liquid are much dependent upon properties of the coloring matter since the recording liquid is basically composed of coloring matter and its solvent or dispersing medium as stated above. Accordingly, it is very important in the art to choose coloring matter so as to provide the recording liquid with the above requested characteristics.

SUMMARY OF THE INVENTION

An object of this invention is to provide a novel monoazo compound suitable as coloring matter of a recording liquid which satisfies the above noted requirements (1) to (7) of performance characteristics at the same time.

According to one aspect of this invention, there is provided a recording liquid comprising coloring matter, which is an image-forming component, and a liquid medium for dissolving or dispersing the coloring matter, said recording liquid being characterized by containing at least one of the dyes represented by the following general formula (A), as an image-forming component.

General formula (A):

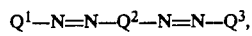

$Q^1$—N=N—$Q^2$—N=N—$Q^3$, wherein $Q^1$ and $Q^3$ each represent a substituted phenyl or naphthyl group having at least one $SO_3M$ substituent and $Q^2$ represents a substituted naphthyl group having at least one $SO_3M$ substituent, M being a base selected from Na, K, Li, $NH_4$, and amine salt cations.

According to another aspect of this invention, there is provided a recording liquid comprising coloring matter, which is an image-forming component, and a liquid medium for dissolving or dispersing the coloring matter, said recording liquid being characterized by containing at least one of the dyes represented by the following general formula (B), as an image-forming component.

General formula (B):

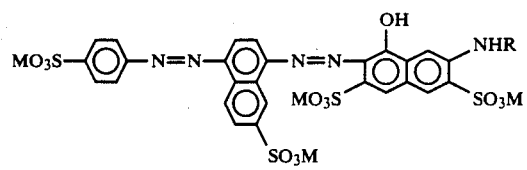

wherein; R represents one member selected from the group consisting of —$COCH_3$,

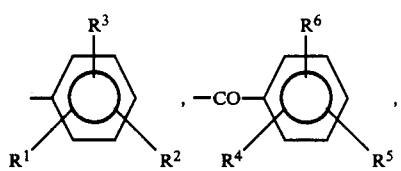

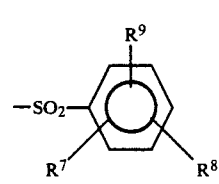

$R^1$, $R^2$, $R^3$, $R^4$, $R^5$, $R^6$, $R^7$, $R^8$ and $R^9$ each being a member selected from the group consisting of H, $CH_3$,
$C_2H_5$, Cl, $NH_2$, OH and $OCH_3$; and M represents a base selected from Na, K, Li, $NH_4$ and amine salt cations.

DETAILED DESCRIPTION OF PREFERRED EMBODIMENTS OF THE INVENTION

Figure 1:
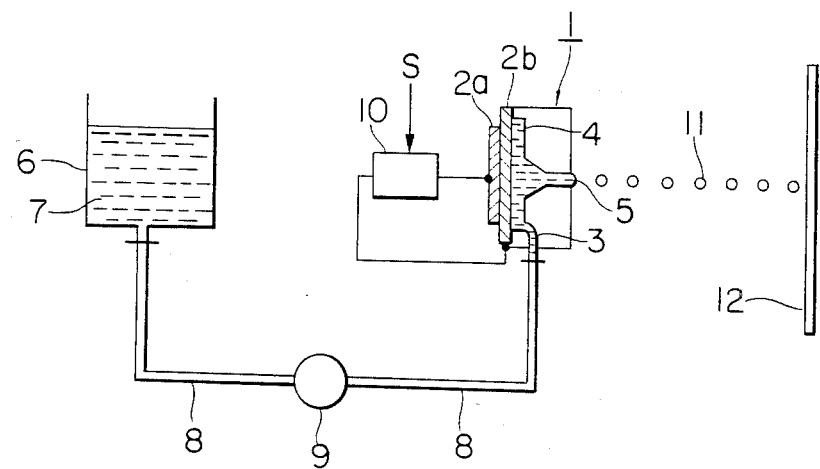
FIGS. 1 and 2 are schematic illustrations of ink-jet recorders.
Figure 2:
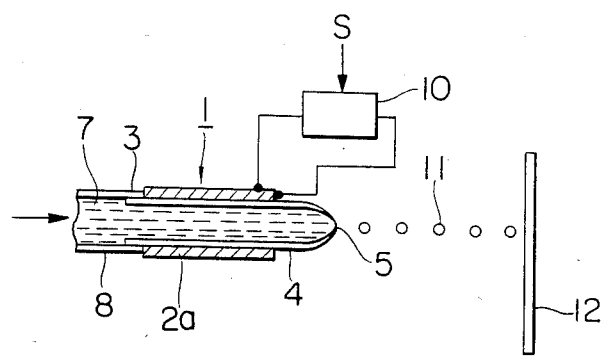
Figure 3A:
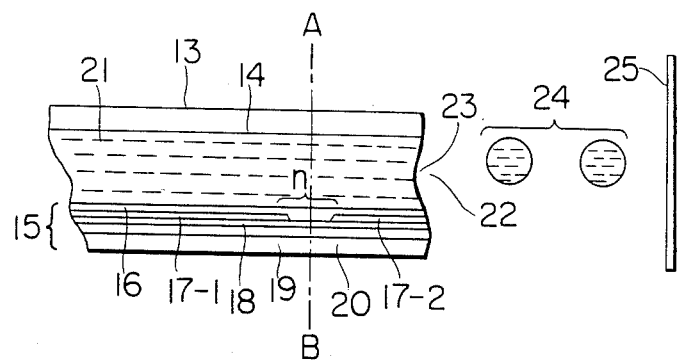
FIGS. 3A and 3B are vertical and transverse sectional views of the head of another ink-jet recorder, respectively.
Figure 3B:
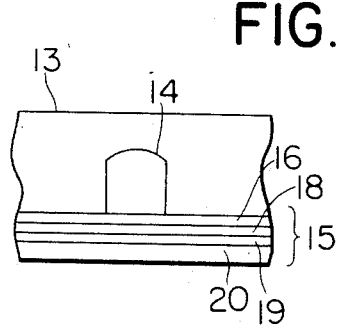
Figure 4:
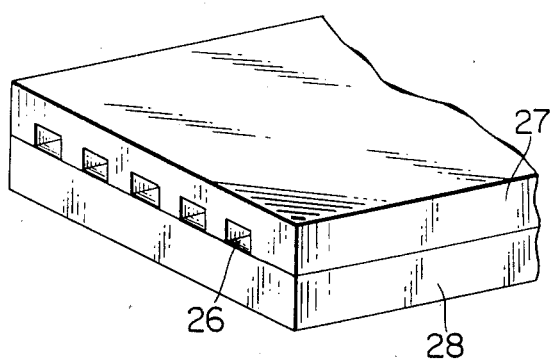
FIG. 4 is a perspective view of a multi-head which is an array of such heads as shown in FIGS. 3A and 3B.

The typical dyes of Formula (A) according to the present invention are as follows.

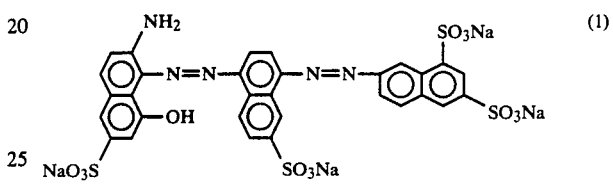
(1)

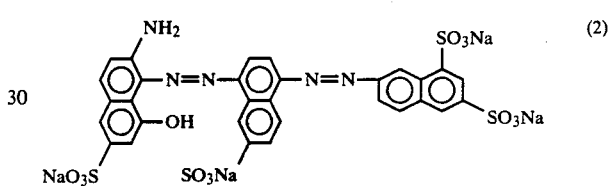
(2)

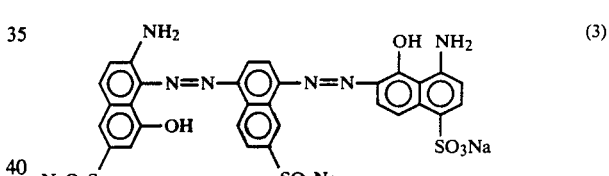
(3)

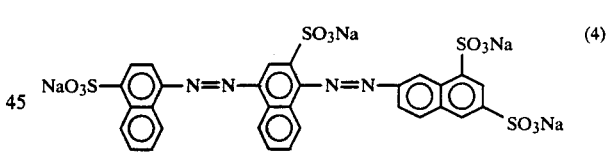
(4)

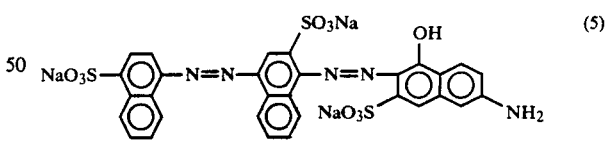
(5)

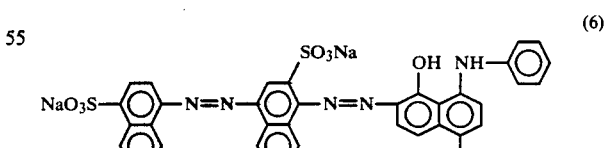
(6)

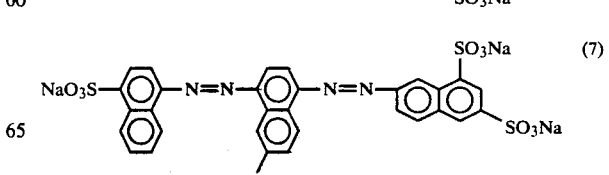
(7)

-continued
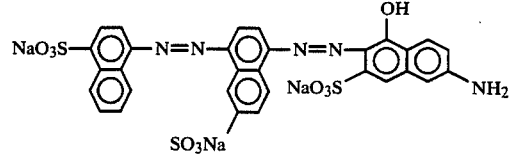 (8)
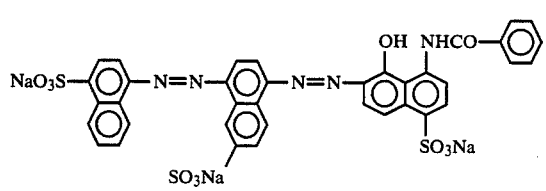 (9)
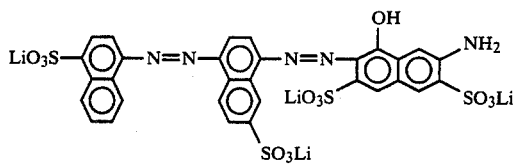 (10)
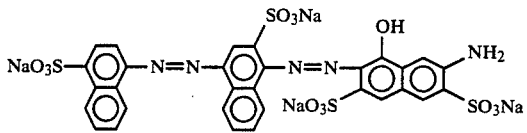 (11)
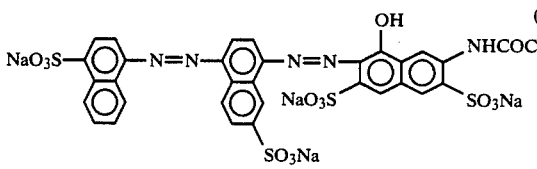 (12)
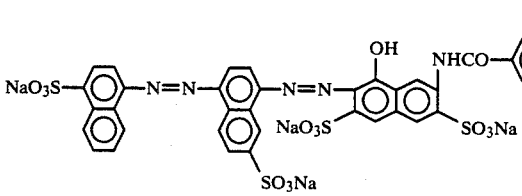 (13)
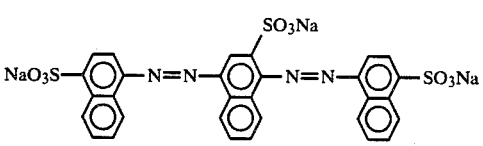 (14)
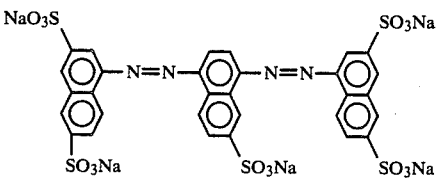 (15)
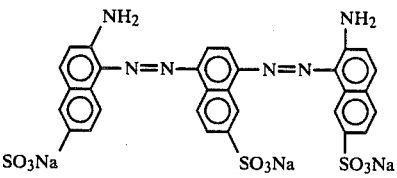 (16)
-continued
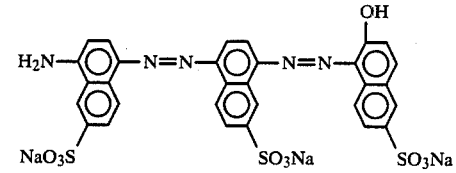 (17)
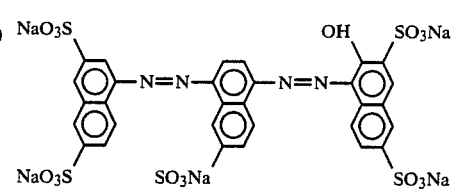 (18)
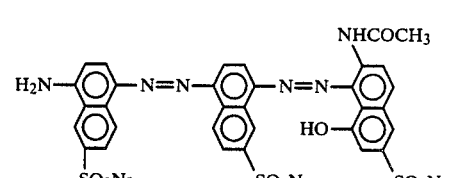 (19)
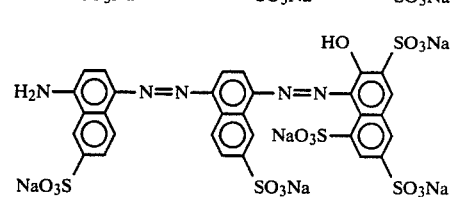 (20)
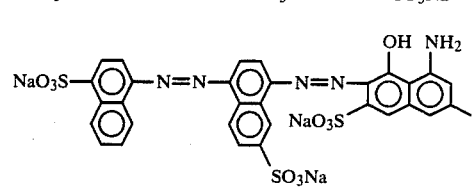 (21)
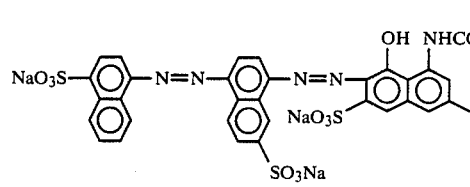 (22)
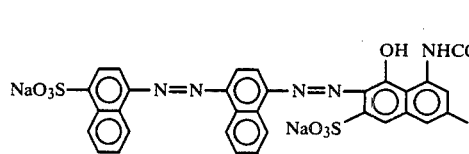 (23)
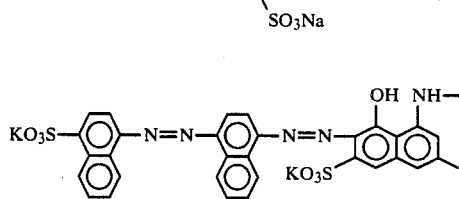 (24)
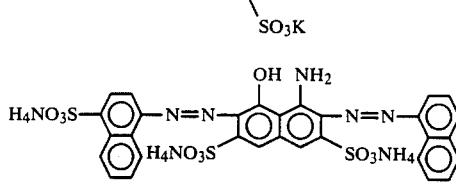 (25)

-continued
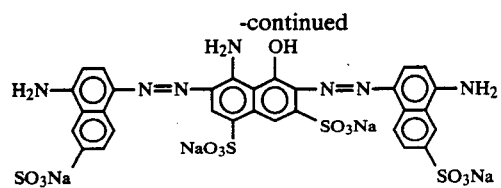 (26)
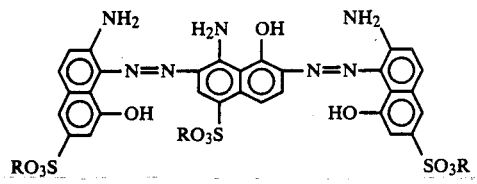 (27)
wherein, R = HN(CH₂CH₂OH)₃
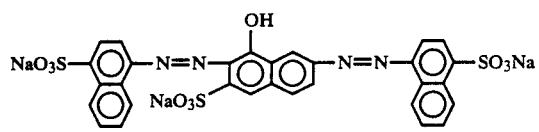 (28)
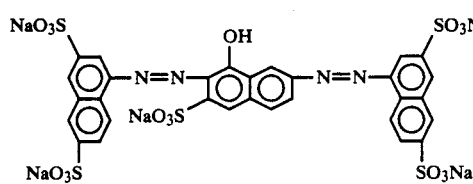 (29)
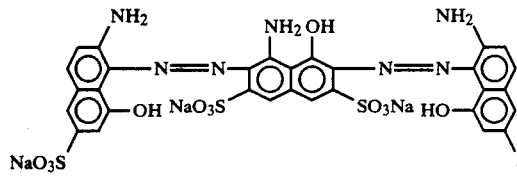 (30)
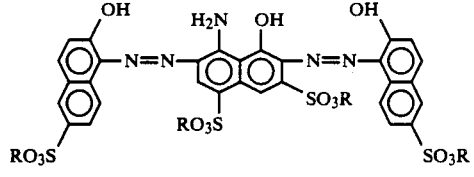 (31)
wherein, R = HN(CH₂CH₂OH)₃
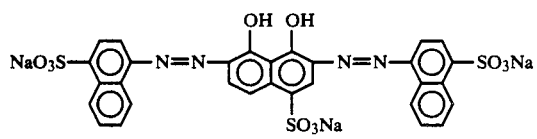 (32)
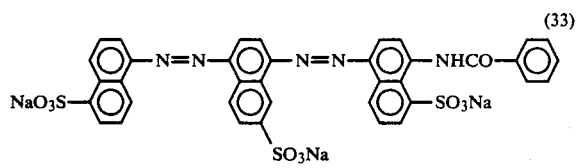 (33)
-continued
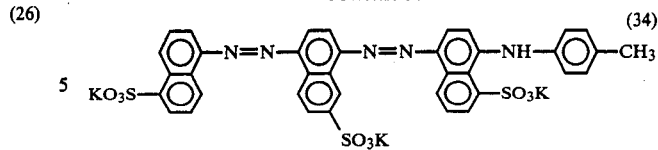 (34)
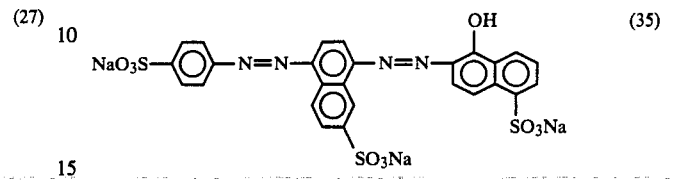 (35)
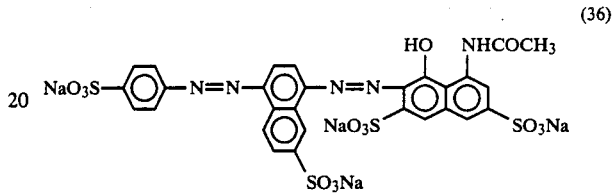 (36)
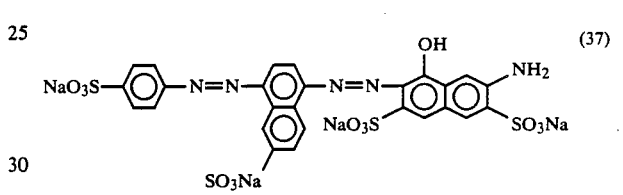 (37)
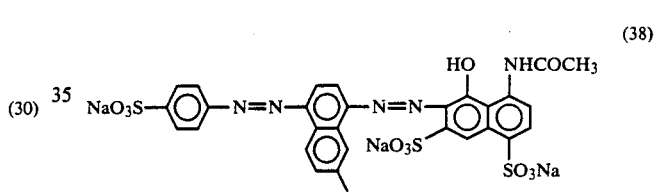 (38)
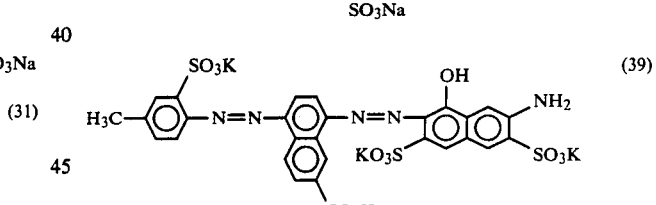 (39)
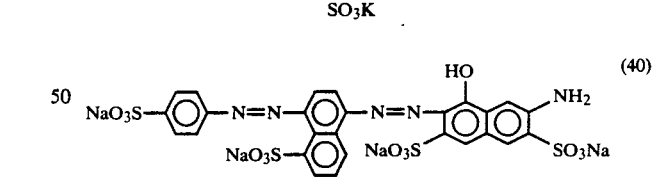 (40)
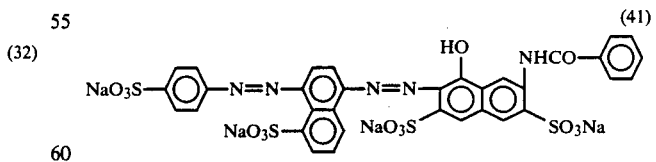 (41)
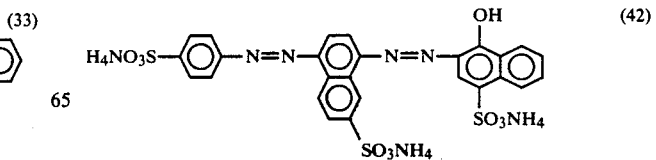 (42)

-continued
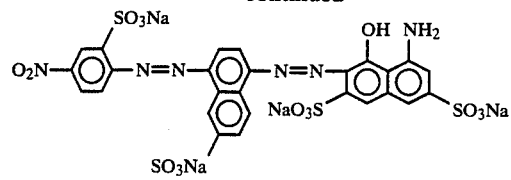 (43)
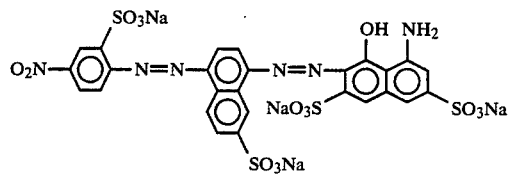 (44)
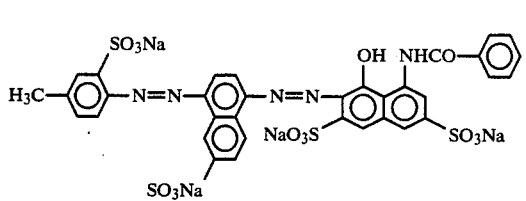 (45)
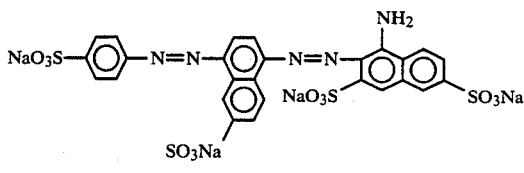 (46)
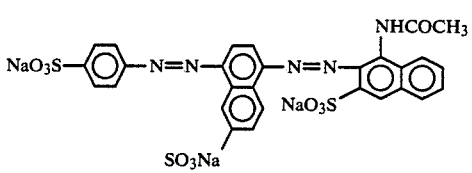 (47)
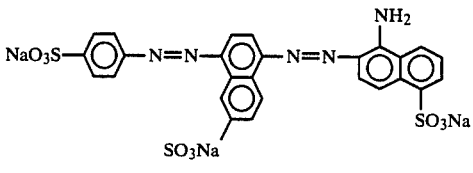 (48)
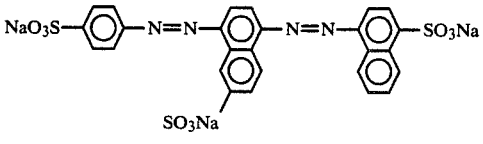 (49)
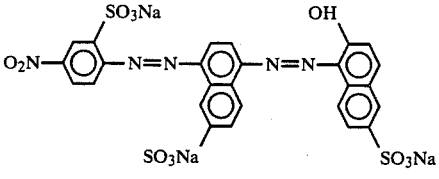 (50)
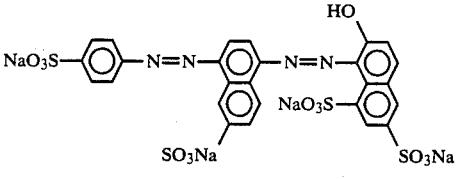 (51)
-continued
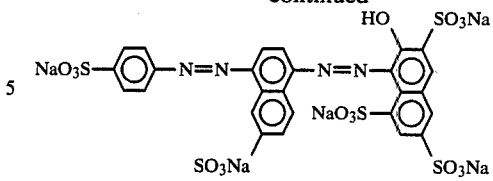 (52)
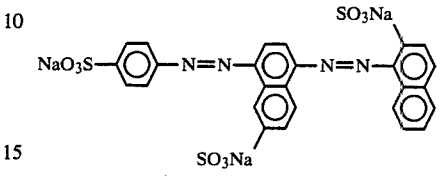 (53)
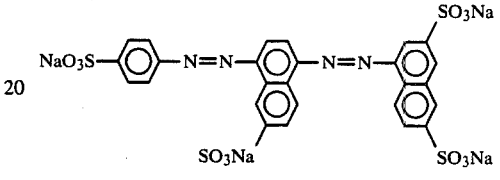 (54)
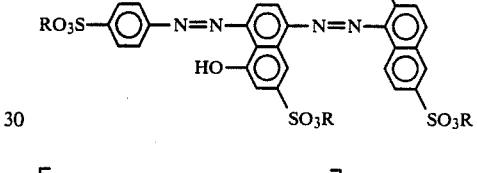 (55)
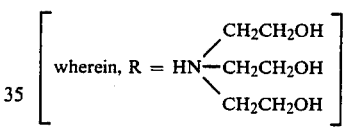
$$\left[\text{wherein, R} = \text{HN}\begin{array}{l}\text{CH}_2\text{CH}_2\text{OH}\\\text{CH}_2\text{CH}_2\text{OH}\\\text{CH}_2\text{CH}_2\text{OH}\end{array}\right]$$
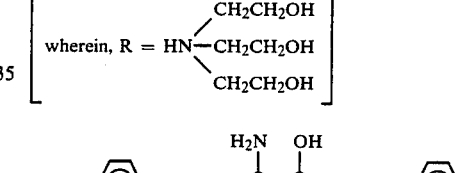 (56)
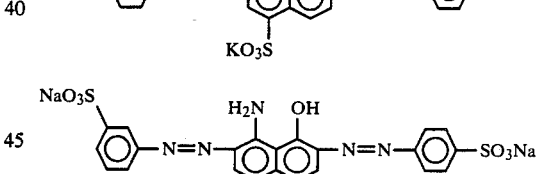 (57)
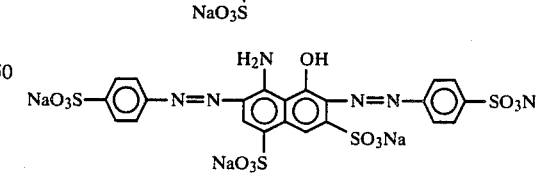 (58)
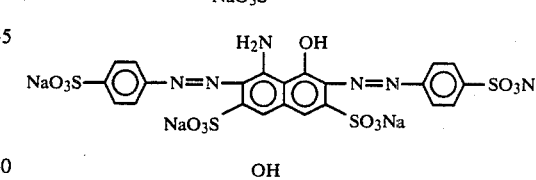 (59)
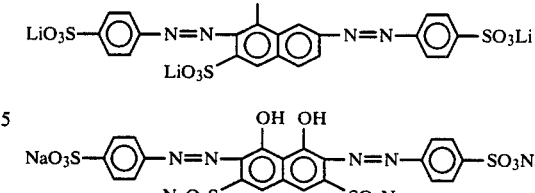 (60)
 (61)

-continued
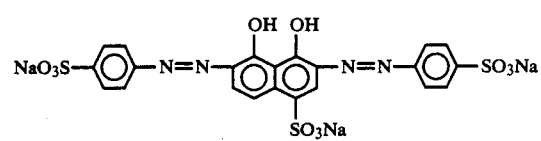 (62)
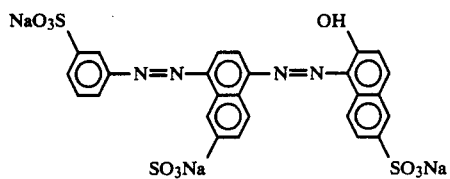 (63)
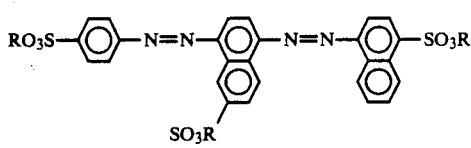 (64)
wherein, R = HN(CH₂CH₂OH)₃
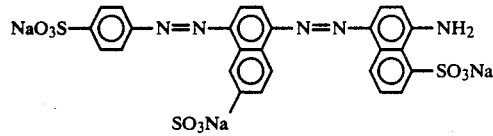 (65)
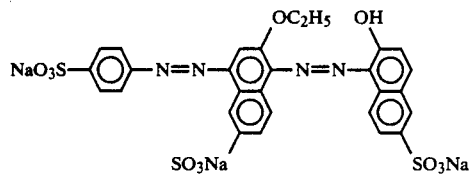 (66)
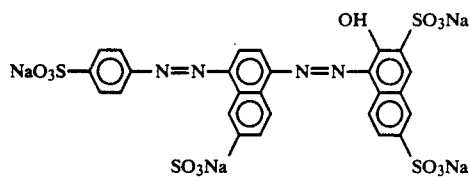 (67)
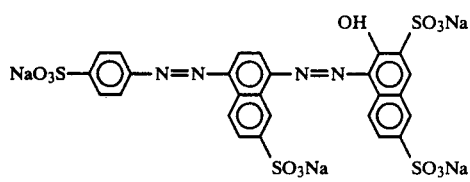 (68)
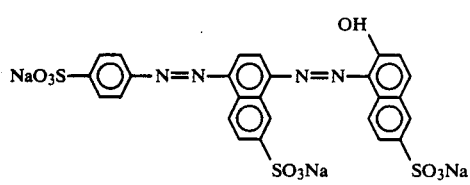 (69)
-continued
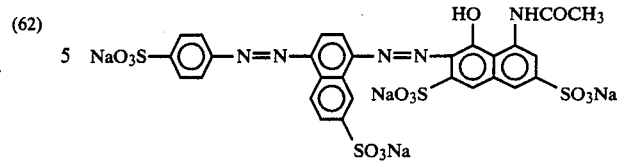 (70)
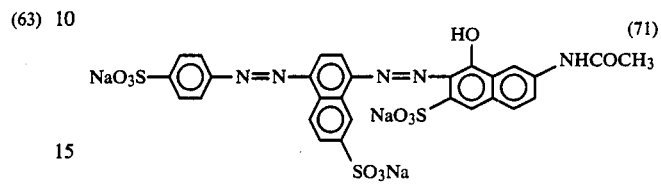 (71)
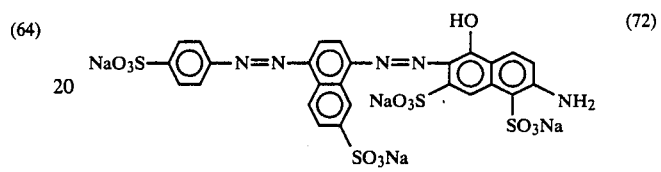 (72)
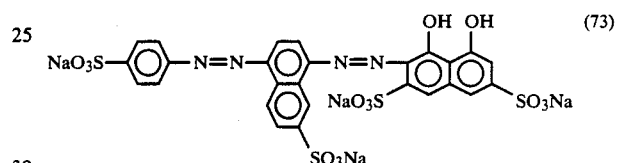 (73)
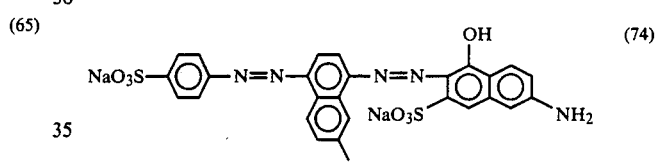 (74)
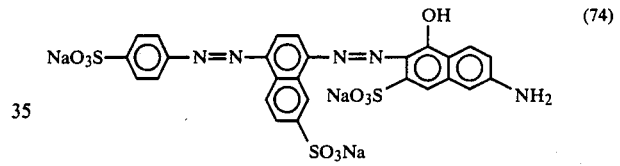 (75)
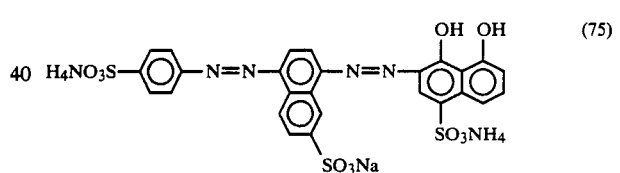 (76)
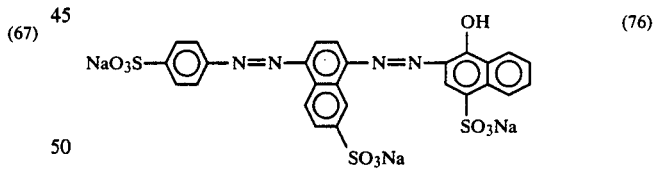 (77)
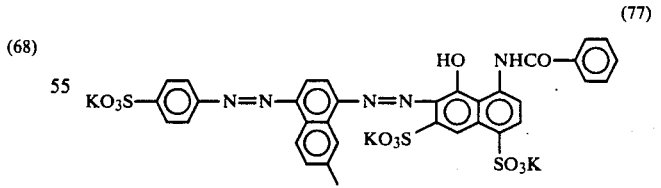 (78)

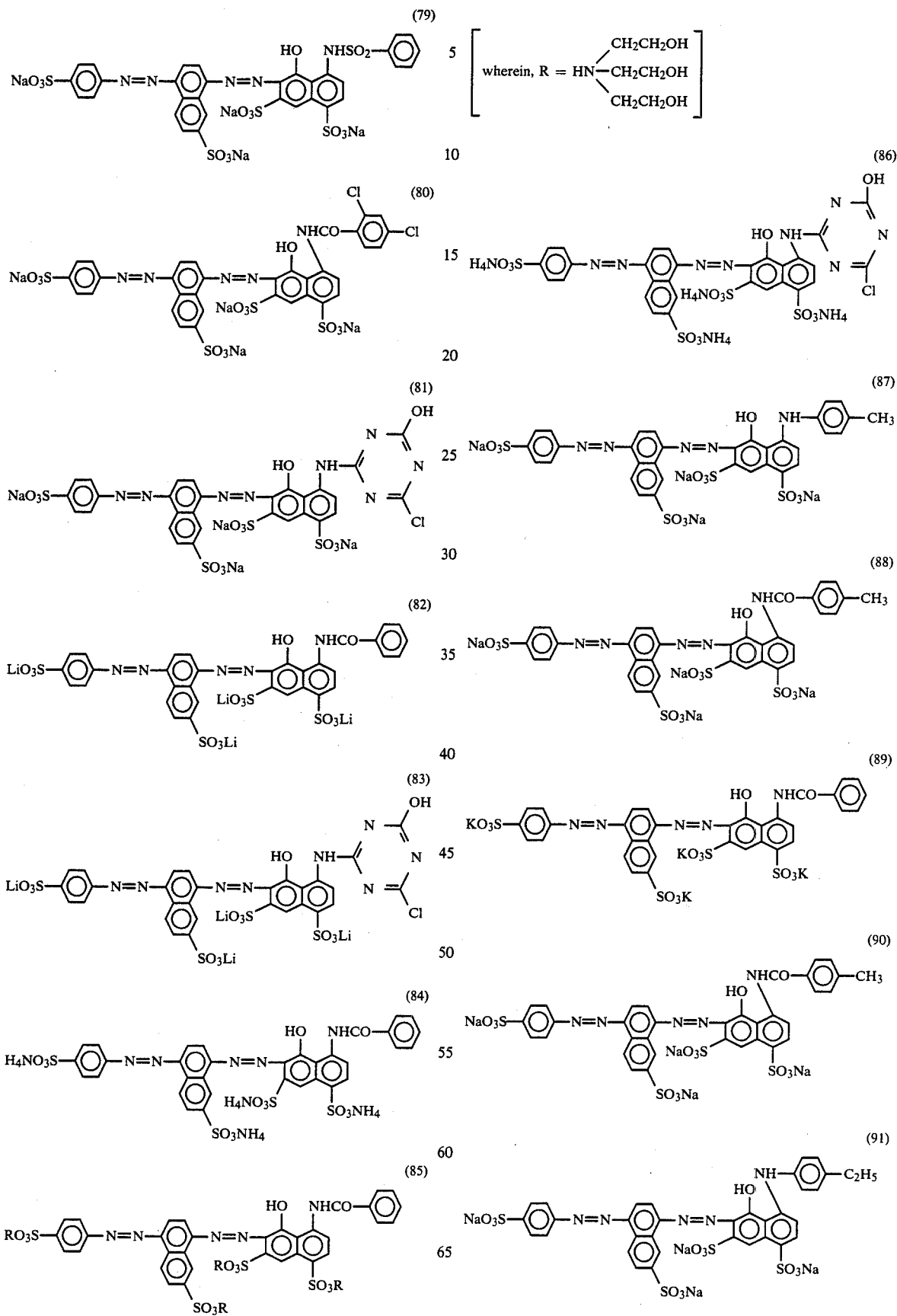

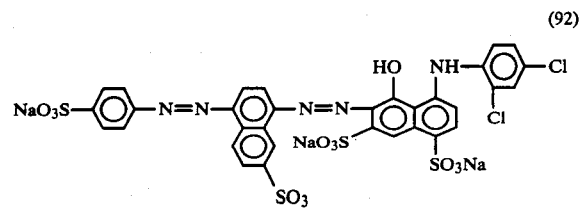
(92)
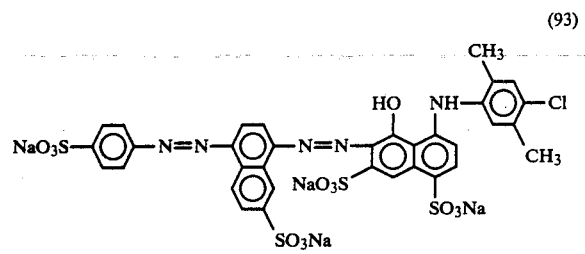
(93)
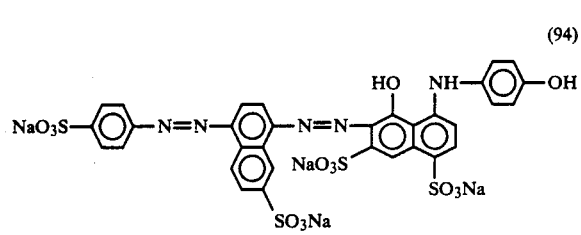
(94)
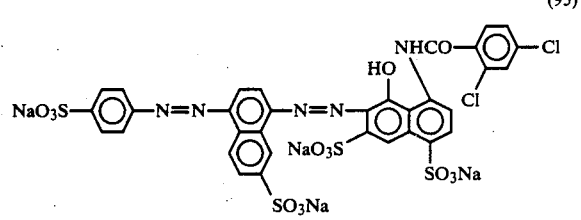
(95)
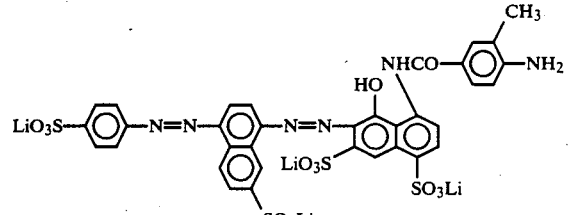
(96)
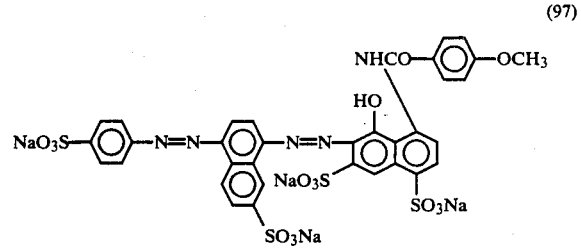
(97)
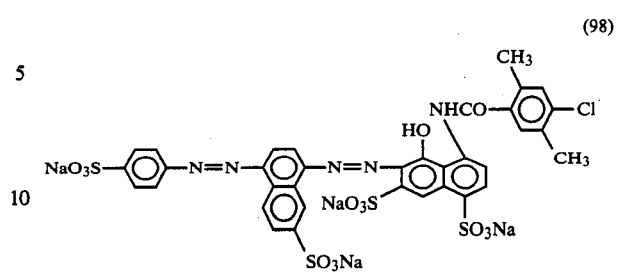
(98)
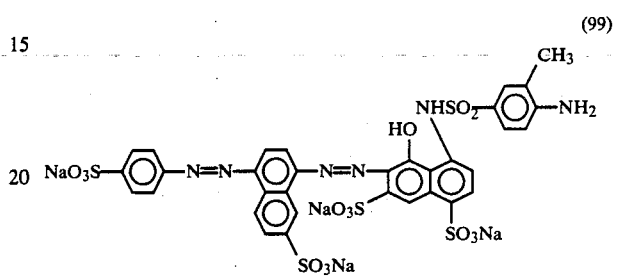
(99)
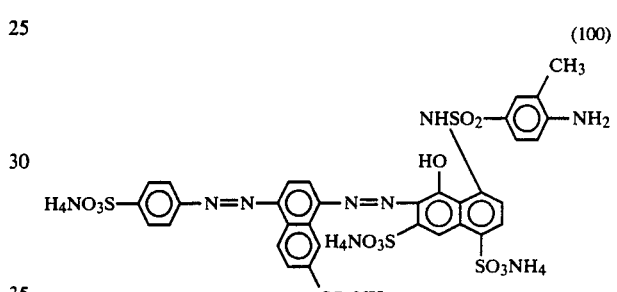
(100)
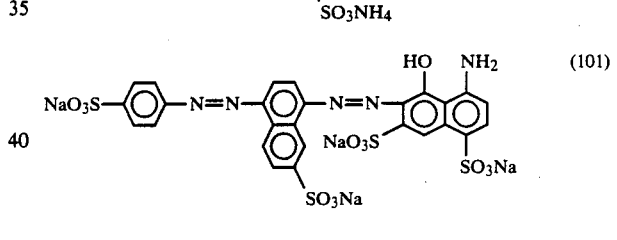
(101)
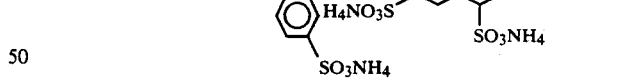
(102)
The typical dyes of Formula (B) according to the present invention are as follows.

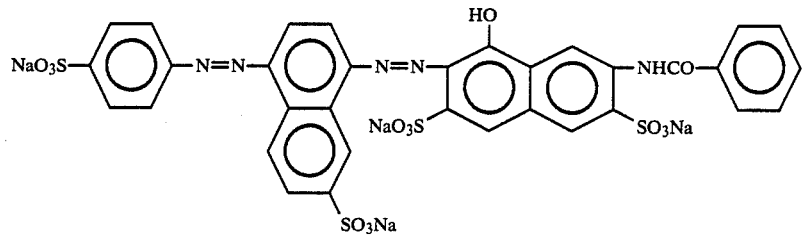
(103)
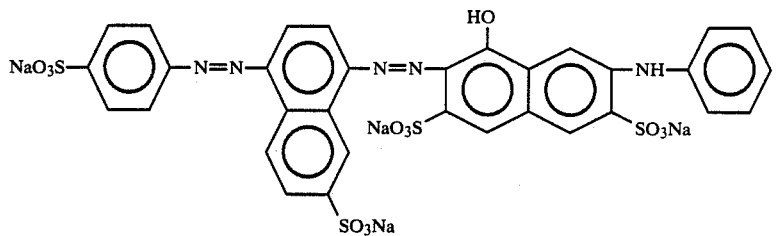
(104)
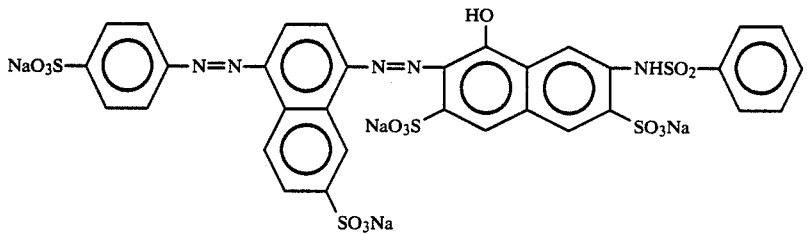
(105)
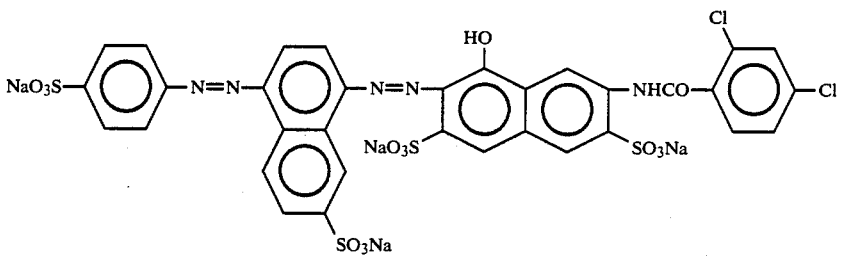
(106)
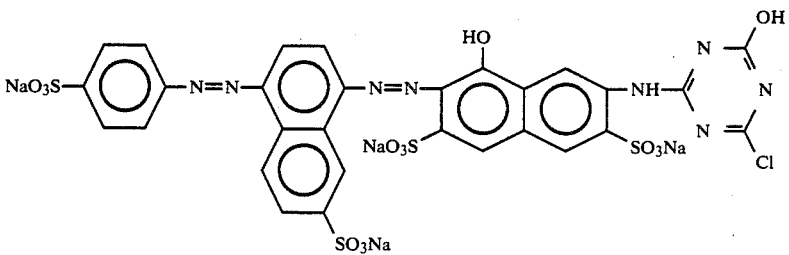
(107)
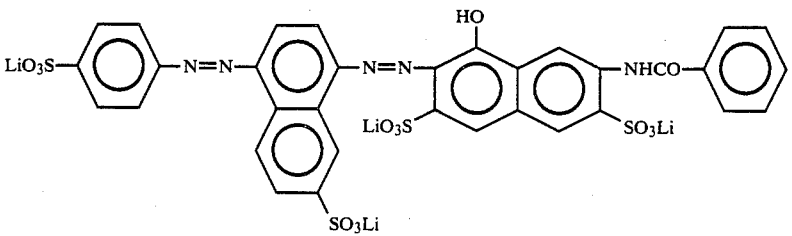
(108)

-continued
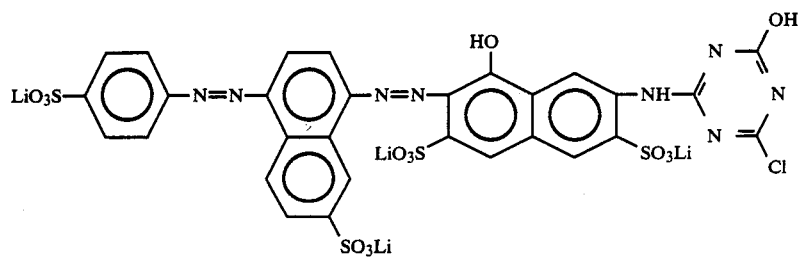 (109)
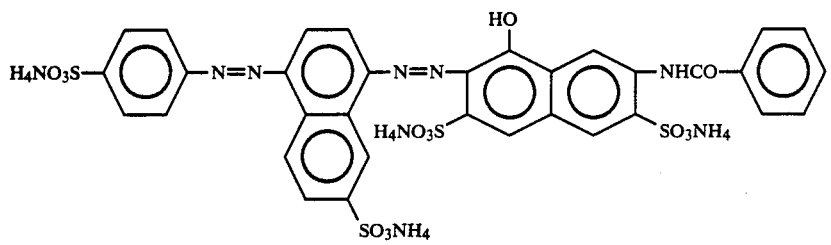 (110)
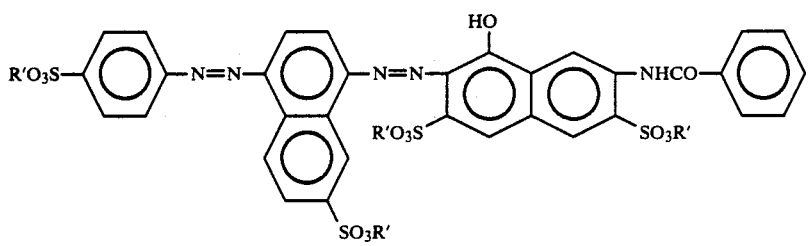 (111)
$$\text{wherein, } R' = HN \begin{array}{l} CH_2CH_2OH \\ CH_2CH_2OH \\ CH_2CH_2OH \end{array}$$
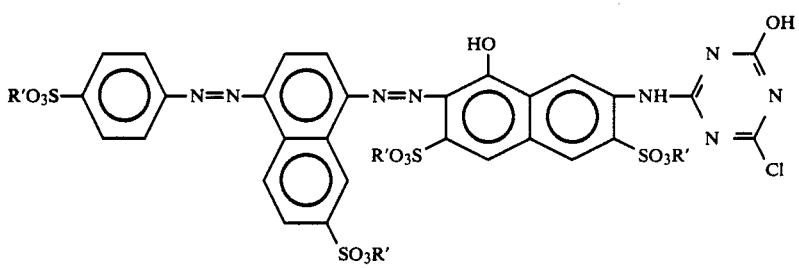 (112)
$$\text{wherein, } R' = HN \begin{array}{l} CH_2CH_2OH \\ CH_2CH_2OH \\ CH_2CH_2OH \end{array}$$
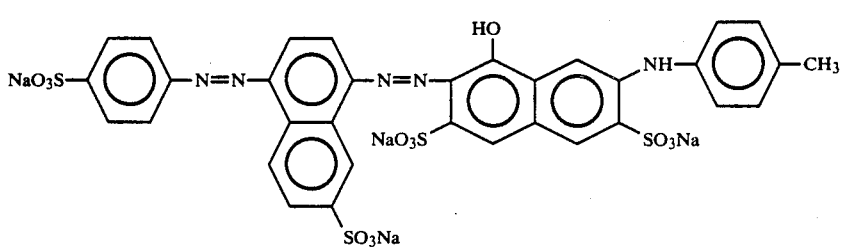 (113)

-continued
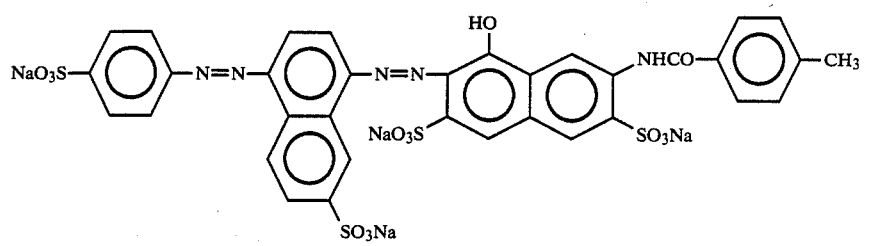
(114)
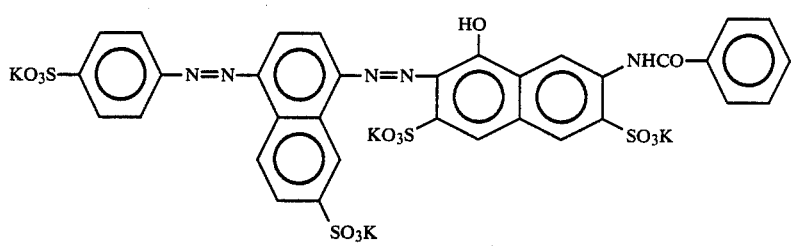
(115)
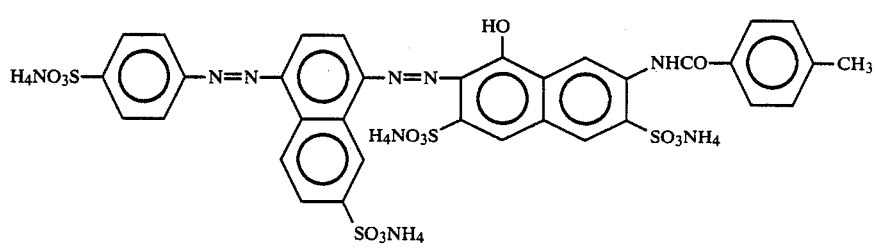
(116)
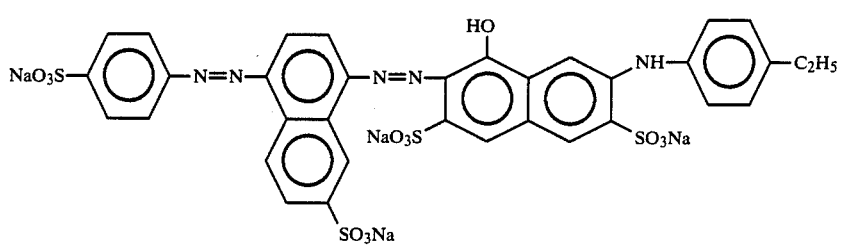
(117)
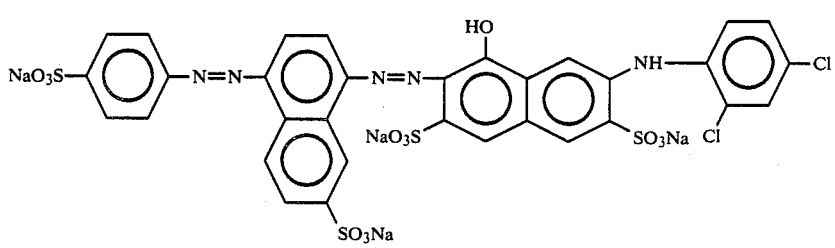
(118)
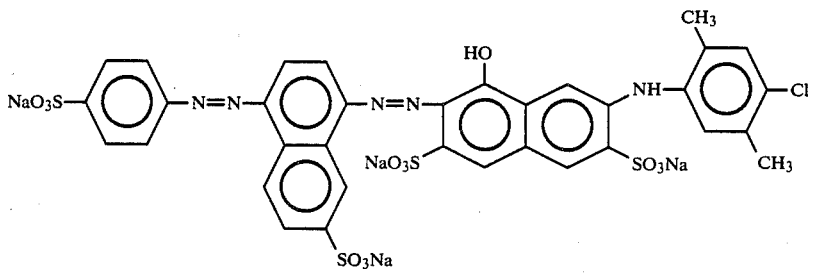
(119)

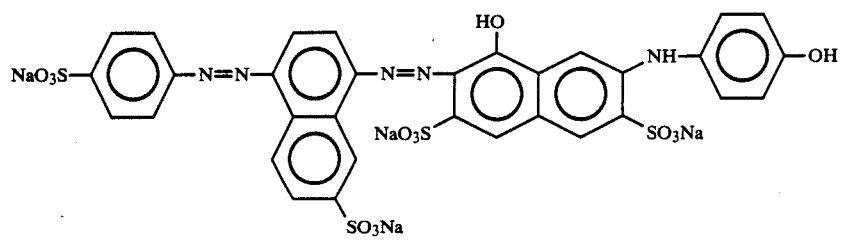
(120)
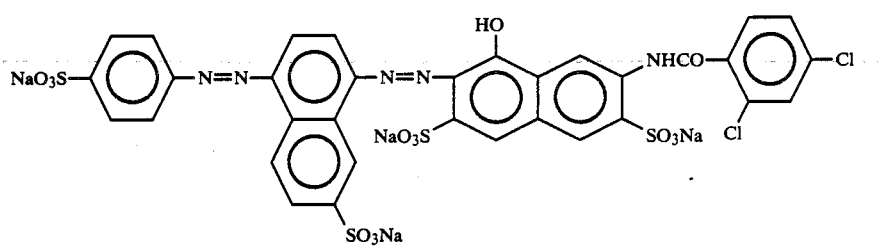
(121)
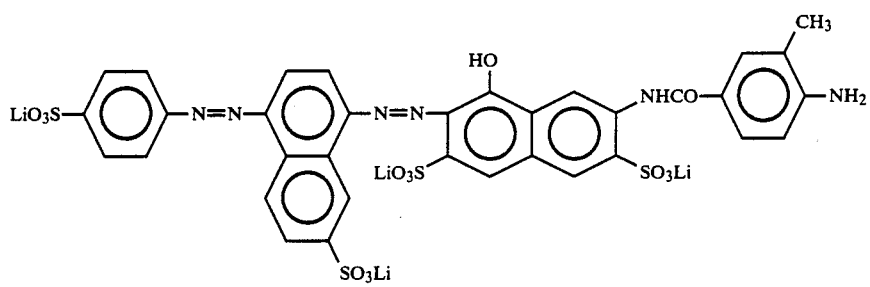
(122)
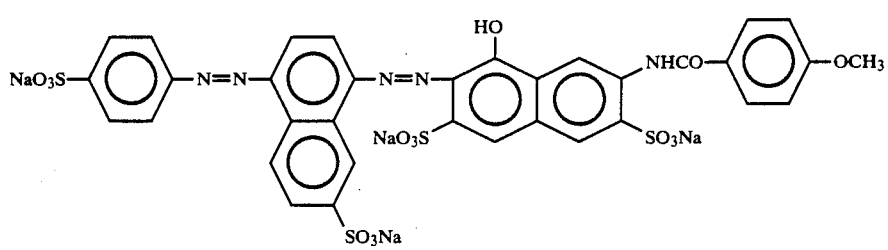
(123)
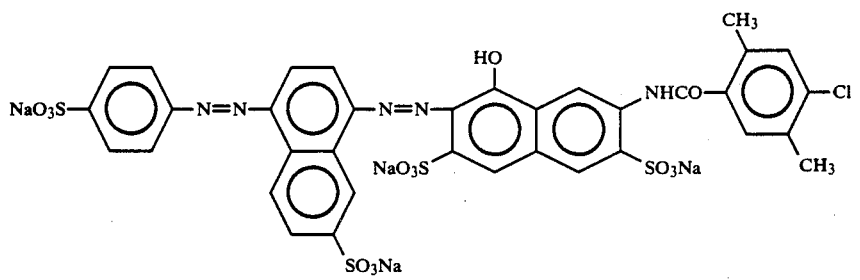
(124)
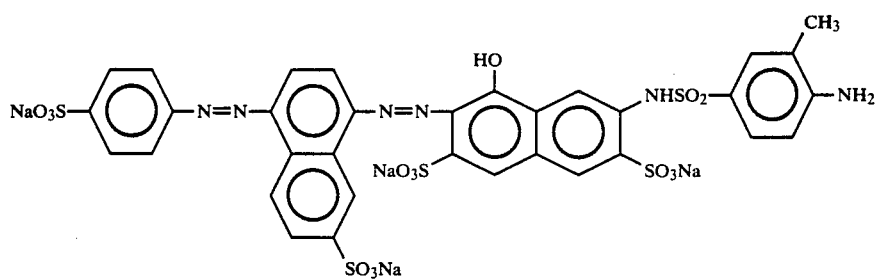
(125)

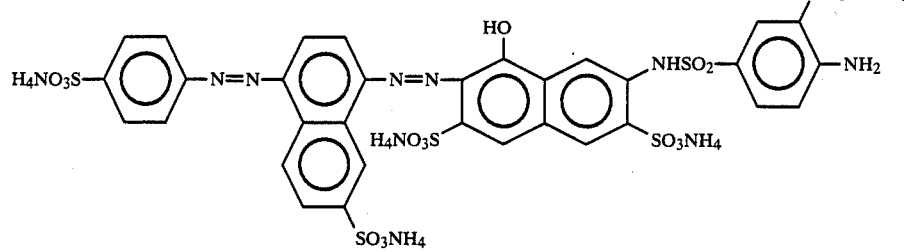
(126)

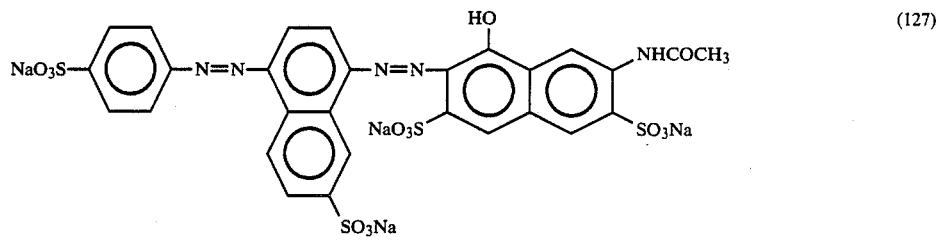
(127)

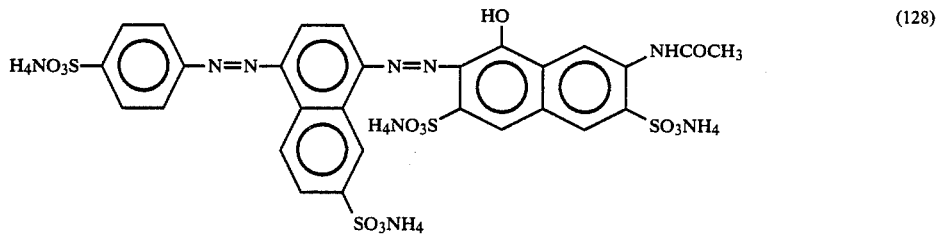
(128)

According to this invention, a recording liquid can be obtained which; has physical properties such as viscosity and surface tension within proper respective ranges and a high fixing rate; does not cause clogging of a fine orifice; does not change any of its own physical properties or precipitate solid matter, during storage; can be applied to various recording media without any particular restriction; and forms high density images superior in fastness to water, light, and rubbing and in the degree of resolution.

The content of the monoazo compound, i.e. the dye, of this invention in the recording liquid is chosen depending upon the kinds of liquid medium components and the desired characteristics of the recording liquid, but is generally 0.1–20%, desirably 0.5–15%, and preferably 1–10%, by weight based on the whole weight of recording liquid. The recording liquid of this invention may contain one or more of these monoazo dyes as essential components with or without any of other various dyes such as direct dyes and acid dyes.

Water or mixtures of water with a water-miscible organic solvent can be employed as liquid medium of the recording liquid in this invention. Examples of the water-miscible organic solvent are; $C_1$–$C_4$ alcohols such as methanol, ethanol, n-propanol, isopropanol, n-butanol, sec-butanol, tert-butanol and isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazolidinone; polyalkylene glycols such as polyethylene glycol and polypropylene glycol; $C_2$–$C_6$ alkylene glycols such as ethylene glycol, propylene glycol, butylene glycol, triethylene glycol, thiodiglycol, hexylene glycol and diethylene glycol; 1,2,6-hexanetriol; glycerol; and lower alkyl ethers of polyhydric alcohols such as ethylene glycol methyl ether, diethylene glycol methyl (or ethyl) ether, and triethylene glycol monomethyl (or monoethyl) ether.

The content of the water-miscible organic solvent in the recording liquid is generally 5–95%, desirably 10–80%, and preferably 20–50%, by weight based on the whole weight of recording liquid.

The water content for this is chosen from a wide range depending upon the kinds of liquid medium components, the composition of the liquid medium, and desired characteristics of the recording liquid, but is generally 10–90%, desirably 10–70%, and preferably 20–70%, by weight based on the whole weight of recording liquid.

The recording liquid of this invention prepared from the above components is in itself superior and well balanced in recording performance characteristics (signal responsiveness, stability for producing droplets, discharge stability, long-hour continuous workability, and discharge stability after a long rest), storage stability, fixability to recording media, and light fastness, weather resistance, and wet fastness of the resulting image. However, known miscellaneous additives also may be incorporated into the above recording liquid for the purpose of further improving such characteristics. Such additives include, for example, viscosity modifiers such as poly (vinyl alcohol), cellulosic resins, and other water-soluble resins; various kinds of surfactants cationic, anionic and nonionic; surface tension modifiers such as diethanolamine and triethanolamine; pH conditioners such as buffer solutions; and fungicides. For preparing a recording liquid to be used in the type of ink-jet recording system based on the electrical charging of recording liquid, an inorganic salt such as lithium chloride, ammonium chloride or sodium chloride is added as a resistivity modifier.

When the recording liquid is used in the type of ink-jet recording system based on the action of thermal energy, thermal properties (e.g. specific heat, coefficient of thermal expansion, and heat conductivity) of the recording liquid may sometimes be conditioned.

This invention is illustrated in more detail with reference to the following Examples:

EXAMPLE 1

A recording liquid was prepared by thorough mixing the following composition, filtering the resulting solution under pressure through a 1μ pore size Teflon filter, and degassing the filtrate in vacuo.

| Composition: | |
| --- | --- |
| Dye (about listed dye No. 23) | 3 parts |
| Diethylene glycol | 25 parts |
| N—Methyl-2-pyrrolidone | 20 parts |
| Water | 52 parts |

The resulting recording liquid was subjected to the following tests $T_1$–$T_5$ by using an on-demand type of ink-jet recording head which discharges droplets of recording lliquid with piezo oscillators (orifice dia. 50μ, piezo oscillator-driving voltage 60 V, frequency 4 KHz). The results of all the tests were satisfactory.

($T_1$) Long-term storage stability of recording liquid:

After the specimen had been sealed in glass containers and stored for 6 months at −30° C. or 60° C., no deposition of insoluble matter was observed and no physical property change or color change was detected in the specimen.

($T_2$) Discharge stability:

The specimen was continuously discharged for 24 hours at room temperature, 5° C. or 40° C., with the result that good quality records were constantly obtained throughout the test period at all the temperatures.

($T_3$) Discharge responsiveness:

The specimen was discharged intermittently at two-second intervals and discharged after standing for two months. In both the cases, stable uniform recording without clogging the orifice was achieved.

($T_4$) Quality of images formed:

Images formed by use of the specimen were of high optical density and sharp and clear. These images, exposed to ambient light in a room for three months, showed only 1% or less drop in optical density. Immersion of the recorded paper sheets in water for one minute gave very little blotting of the images.

($T_5$) Fixability to various kinds of recording paper:

Images formed by use of the specimen on the following kinds of paper were rubbed with a finger 15 seconds after recording, and the shift and blotting of the rubbed parts of images were inspected. The results indicated none of the shift and blotting, proving a good fixability of the recording liquid.

| Tradename of paper | Paper grade or type | Maker |
| --- | --- | --- |
| Ginkan | High quality | Sanyo Kokusaku Pulp Co., Ltd. |
| Seven star | High quality | Hokuetsu Seishi Co., Ltd. |
| Haku-botan | Medium quality | Honshu Seishi |

-continued

| Tradename of paper | Paper grade or type | Maker |
| --- | --- | --- |
| | | Co., Ltd. |
| Toyo Filter Paper No.4 | Non sized type | Toyo Roshi Co., Ltd. |

EXAMPLE 2

A recording liquid of the following composition was prepared in the same manner as in Example 1.

| Composition: | |
| --- | --- |
| Dye (above listed dye No. 36) | 3 parts |
| Diethylene glycol | 20 parts |
| N—Methyl-2-pyrrolidone | 20 parts |
| Water | 57 parts |

This recording liquid was subjected to the tests $T_1$–$T_5$ in the same manner as in Example 1 but using an on-demand type of ink-jet recording multi-head which discharges droplets of recording liquid by the action of thermal energy (orifice dia. 35μ, resistance of heating resistor 150Ω, operational voltage 30 V, frequency 2 KHz). All the results were satisfactory.

EXAMPLE 3

In the same manner as in Example 1, a recording liquid of the following composition was prepared and subjected to the tests $T_1$–$T_5$ but using an on-demand type of ink-jet recording multi-head (the same that used in Example 2). All the results were satisfactory.

| Composition: | |
| --- | --- |
| Dye (about listed dye No. 44) | 2.5 parts |
| Diethylene glycol | 20 parts |
| N—Methyl-2-pyrrolidone | 15 parts |
| Polyethylene glycol (mol. wt. 300) | 10 parts |
| Water | 52.5 parts |

EXAMPLE 4

In the same manner as in Example 1, a recording liquid of the following composition was prepared and subjected to the tests $T_1$–$T_5$ but using an on-demand type of ink-jet recording multi-head (the same that used in Example 2). All the results were satisfactory.

| Composition: | |
| --- | --- |
| Dye (above listed dye No. 77) | 3 parts |
| Diethylene glycol | 20 parts |
| N—Methyl-2-pyrrolidone | 20 parts |
| Water | 57 parts |

EXAMPLE 5

In the same manner as in Example 1, a recording liquid of the following composition was prepared and subjected to the tests $T_1$–$T_5$ but using an on-demand type of ink-jet recording multi-head (the same that used in Example 2). All the results were satisfactory.

| Composition: | |
| --- | --- |
| Dye (above listed dye No. 67) | 2.5 parts |

-continued

| Composition: | |
|---|---|
| Diethylene glycol | 20 parts |
| N—Methyl-2-pyrrolidone | 15 parts |
| Water | 62.5 parts |

EXAMPLE 6

In the same manner as in Example 1, a recording liquid of the following composition was prepared and subjected to the tests $T_1$–$T_5$ using an on-demand type of ink-jet recording head (the same piezo oscillation type that used in Example 1). All the results were satisfactory.

| Composition: | |
|---|---|
| Dye (above listed dye No. 103) | 3 parts |
| Diethylene glycol | 25 parts |
| N—Methyl-2-pyrrolidone | 20 parts |
| Water | 52 parts |

EXAMPLE 7

In the same manner as in Example 1, a recording liquid of the following composition was prepared and subjected to the tests $T_1$–$T_5$ but using an on-demand type of ink-jet recording multi-head (the same that used in Example 2). All the results were satisfactory.

| Composition: | |
|---|---|
| Dye (above listed dye No. 107) | 2.5 parts |
| Diethylene glycol | 25 parts |
| N—Methyl-2-pyrrolidone | 20 parts |
| Water | 52.5 parts |

EXAMPLE 8

In the same manner as in Example 1, a recording liquid of the following composition was prepared and subjected to the tests $T_1$–$T_5$ but using an on-demand type of ink-jet recording multi-head (the same that used in Example 2). All the results were satisfactory.

| Composition: | |
|---|---|
| Dye (above listed dye No. 104) | 2.5 parts |
| Diethylene glycol | 20 parts |
| N—Methyl-2-pyrrolidone | 15 parts |
| Polyethylene glycol (mol. wt. 300) | 10 parts |
| Water | 52.5 parts |

EXAMPLE 9

In the same manner as in Example 1, a recording liquid of the following composition was prepared and subjected to the tests $T_1$–$T_5$ but using an on-demand type of ink-jet recording multi-head (the same that used in Example 2). All the results were satisfactory.

| Composition: | |
|---|---|
| Dye (above listed dye No. 116) | 3 parts |
| Diethylene glycol | 20 parts |
| N—Methyl-2-pyrrolidone | 20 parts |
| Water | 57 parts |

EXAMPLE 10

In the same manner as in Example 1, a recording liquid of the following composition was prepared and subjected to the tests $T_1$–$T_5$ but using an on-demand type of ink-jet recording multi-head (the same that used in Example 2). All the results were satisfactory.

| Composition: | |
|---|---|
| Dye (above listed dye No. 111) | 3 parts |
| Diethylene glycol | 20 parts |
| N—Methyl-2-pyrrolidone | 15 parts |
| Water | 62 parts |

EXAMPLE 11

A recording liquid of the following composition was prepared in the same manner as in Example 1.

| Composition: | |
|---|---|
| Dye (above listed dye No. 90) | 4 parts |
| Diethylene glycol | 25 parts |
| N—Methyl-2-pyrrolidone | 20 parts |
| Water | 51 parts |

This recording liquid was filled in a felt pen and writing tests were conducted on a medium quality grade of paper (tradename: Haku-botan, made by Honshu Seishi Co., Ltd.) to examine the wet fastness of written images and the writing property after 24-hour standing of the pen with the cap being removed. The results indicated that the recording liquid was superior in both the wet fastness and the writing property after standing.

EXAMPLE 12

A recording liquid of the following composition was prepared in the same manner as in Example 1.

| Composition: | |
|---|---|
| Dye (above listed dye No. 128) | 4 parts |
| Diethylene glycol | 25 parts |
| N—Methyl-2-pyrrolidone | 20 parts |
| Water | 51 parts |

This recording liquid, subjected to the same tests as in Example 11, was found superior in both the wet fastness and the writing property after standing.

EXAMPLES 13–79

In the same manner as in Example 1, recording liquids of the compositions shown in the following Table were prepared and subjected to the tests $T_1$–$T_5$. In the Table, figures in parentheses indicate respective proportions (parts by weight) of the components.

All of these recording liquids were found superior in long-term storage stability, recording characteristics (discharge stability, discharge responsiveness, etc.), fixability and sharpness of recorded images, and the like.

Table

| Example No. | Dye No. | Composition of liquid medium |
|---|---|---|
| 13 | 1(3) | Water(62), Diethylene glycol(20), N—Methyl-2-pyrrolidone(15) |
| 14 | 2(3) | Water(62), Diethylene glycol(30), N—Methyl-2-pyrrolidone(5) |

| Example No. | Dye No. | Composition of liquid medium |
|---|---|---|
| 15 | 5(2) | Water(58), Diethylene glycol(30), N—Methyl-2-pyrrolidone(10) |
| 16 | 3(2) | Water(58), Diethylene glycol(30), Triethylene glycol monomethyl ether (10) |
| 17 | 7(2.5) | Water(52.5), Diethylene glycol(20), N—Methyl-2-pyrrolidone(15), Polyethylene glycol(M.W. 200) (10) |
| 18 | 11(3) | Water(62), Diethylene glycol(20), N—Methyl-2-pyrrolidone(15) |
| 19 | 12(2) | Water(58), Diethylene glycol(30), N—Methyl-2-pyrrolidone(10) |
| 20 | 14(3) | Water(62), Diethylene glycol(30), N—Methyl-2-pyrrolidone(5) |
| 21 | 15(2) | Water(58), Diethylene glycol(30), N—Methyl-2-pyrrolidone(10) |
| 22 | 16(3) | Water(62), Diethylene glycol(20), N—Methyl-2-pyrrolidone(15) |
| 23 | 19(2) | Water(58), Diethylene glycol(30), N—Methyl-2-pyrrolidone(10) |
| 24 | 20(3) | Water(62), Ethylene glycol(25), 1,3-Dimethyl-2-imidazolidinone(10) |
| 25 | 22(3) | Water(62), Ethylene glycol(30), Polyethylene glycol(M.W. 200) (5) |
| 26 | 18(2) | Water(53), Diethylene glycol(30), N—Methyl-2-pyrrolidone(15) |
| 27 | 24(3) | Water(62), Ethylene glycol(25), 1,3-Dimethyl-2-imidazolidinone(10) |
| 28 | 21(3) | Water(62), Diethylene glycol(20), N—Methyl-2-pyrrolidone(15) |
| 29 | 24(3) | Water(62), Diethylene glycol(20), N—Methyl-2-pyrrolidone(15) |
| 30 | 25(2) | Water(58), Diethylene glycol(30), N—Methyl-2-pyrrolidone(10) |
| 31 | 26(3) | Water(62), Ethylene glycol(25), 1,3-Dimethyl-2-imidazolidinone(10) |
| 32 | 27(3) | Water(62), Ethylene glycol(25), 1,3-Dimethyl-2-imidazolidinone(10) |
| 33 | 29(3) | Water(62), Ethylene glycol(30), Polyethylene glycol(M.W. 200) (5) |
| 34 | 30(3) | Water(62), Ethylene glycol(30), Polyethylene glycol(M.W. 200) (5) |
| 35 | 35(3) | Water(62), Diethylene glycol(20), N—Methyl-2-pyrrolidone(15) |
| 36 | 38(2) | Water(58), Diethylene glycol(30), N—Methyl-2-pyrrolidone(10) |
| 37 | 41(2) | Water(58), Diethylene glycol(30), N—Methyl-2-pyrrolidone(10) |
| 38 | 43(2) | Water(58), Diethylene glycol(30), N—Methyl-2-pyrrolidone(10) |
| 39 | 47(2) | Water(58), Diethylene glycol(30), N—Methyl-2-pyrrolidone(10) |
| 40 | 48(2) | Water(58), Diethylene glycol(30), N—Methyl-2-pyrrolidone(10) |
| 41 | 52(3) | Water(62), Diethylene glycol(20), N—Methyl-2-pyrrolidone(15) |
| 42 | 54(3) | Water(62), Ethylene glycol(25), 1,3-Dimethyl-2-imidazolidinone(10) |
| 43 | 57(3) | Water(62), Ethylene glycol(30), Polyethylene glycol(M.W. 200) (5) |
| 44 | 60(3) | Water(62), Ethylene glycol(30), Polyethylene glycol(M.W. 200) (5) |
| 45 | 63(2) | Water(58), Diethylene glycol(30) N—Methyl-2-pyrrolidone(10) |
| 46 | 66(2) | Water(58), Diethylene glycol(30) N—Methyl-2-pyrrolidone(10) |
| 47 | 68(3) | Water(62), Ethylene glycol(25), 1,3-Dimethyl-2-imidazolidinone(10) |
| 48 | 70(3) | Water(62), Ethylene glycol(25), 1,3-Dimethyl-2-imidazolidinone(10) |
| 49 | 72(3) | Water(62), Ethylene glycol(30), Polyethylene glycol(M.W. 200) (5) |
| 50 | 73(2) | Water(58), Dimethylene glycol(30) N—Methyl-2-pyrrolidone(10) |
| 51 | 74(2) | Water(58), Dimethylene glycol(30) N—Methyl-2-pyrrolidone(10) |
| 52 | 75(2) | Water(58), Dimethylene glycol(30) N—Methyl-2-pyrrolidone(10) |
| 53 | 76(2) | Water(58), Dimethylene glycol(30) N—Methyl-2-pyrrolidone(10) |
| 54 | 78(3) | Water(62), Diethylene glycol(20), N—Methyl-2-pyrrolidone(15) |
| 55 | 79(2) | Water(58), Diethylene glycol(30), N—Methyl-2-pyrrolidone(10) |
| 56 | 82(3) | Water(62), Ethylene glycol(25), 1,3-Dimethyl-2-imidazolidinone(10) |
| 57 | 84(3) | Water(62), Ethylene glycol(25), 1,3-Dimethyl-2-imidazolidinone(10) |
| 58 | 85(3) | Water(62), Ethylene glycol(25), 1,3-Dimethyl-2-imidazolidinone(10) |
| 59 | 88(3) | Water(62), Diethylene glycol(20), N—Methyl-2-pyrrolidone(15) |
| 60 | 91(2) | Water(58), Diethylene glycol(30), N—Methyl-2-pyrrolidone(10) |
| 61 | 94(2) | Water(58), Diethylene glycol(30), N—Methyl-2-pyrrolidone(10) |
| 62 | 97(2) | Water(58), Diethylene glycol(30), N—Methyl-2-pyrrolidone(10) |
| 63 | 101(3) | Water(62), Diethylene glycol(20) N—Methyl-2-pyrrolidone(15) |
| 64 | 102(3) | Water(62), Diethylene glycol(20) N—Methyl-2-pyrrolidone(15) |
| 65 | 105(3) | Water(62), Diethylene glycol(30), N—Methyl-2-pyrrolidone(5) |
| 66 | 106(3) | Water(62), Ethylene glycol(30), Polyethylene glycol(M.W. 200) (5) |
| 67 | 108(3) | Water(62), Diethylene glycol(20), N—Methyl-2-pyrrolidone(15) |
| 68 | 109(2.5) | Water(52.5), Diethylene glycol(20), N—Methyl-2-pyrrolidone(15), Polyethylene glycol(M.W. 200) (10) |
| 69 | 110(2) | Water(58), Diethylene glycol(30), Triethylene glycol monomethyl ether(10) |
| 70 | 112(3) | Water(62), Ethylene glycol(25), 1,3-Dimethyl-21-imidazolidinone(10) |
| 71 | 113(2) | Water(53), Diethylene glycol(30), N—Methyl-2-pyrrolidone(15) |
| 72 | 114(2) | Water(53), Diethylene glycol(30), N—Methyl-2-pyrrolidone(15) |
| 73 | 116(3) | Water(52), Diethylene glycol(30), N—Methyl-2-pyrrolidone(15) |
| 74 | 118(2) | Water(58), Diethylene glycol(30), Triethylene glycol monomethyl ether(10) |
| 75 | 119(2.5) | Water(52.5), Diethylene glycol(20), N—Methyl-2-pyrrolidone(15), Polyethylene glycol(M.W. 200) (10) |
| 76 | 120(3) | Water(62), Diethylene glycol(20), 1,3-Dimethyl-2-imidazolidinone(15) |
| 77 | 122(3) | Water(64), Ethylene glycol(30) Polyethylene glycol(M.W. 200) (3) |
| 78 | 123(3) | Water(62), Diethylene glycol(30), N—Methyl-2-pyrrolidone(5) |
| 79 | 127(2) | Water(53), Diethylene glycol(30), N—Methyl-2-pyrrolidone(15) |

As illustrated above, the recording liquid of this invention has advantages as follows:

(1) It is good in long-term storage stability, scarecely clogging the discharge orifice.

(2) It can be stably discharged over a wide range of variations in temperature or operational conditions.

(3) It is quickly fixed to a recording media and gives clear and sharp images.

(4) Images printed therewith exhibit good fastness to water and light.

(5) It is highly secure and does not attack any of the materials to be in contact therewith, such as its container, sealant, and so forth.

What we claim is:

1. A recording liquid for ink-jet recording comprising coloring matter, which is an image-forming component, and a liquid medium for dissolving or dispersing the coloring matter, said recording liquid being characterized by containing at least one of the dyes represented by the following general formula (B), as an image-forming component,

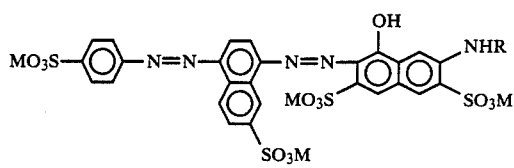

wherein; R represents one member selected from the group consisting of —COCH$_3$,

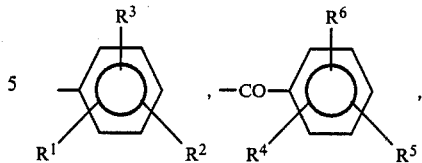

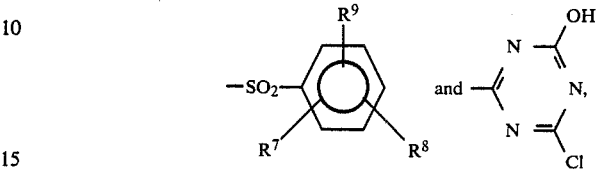

$R^1$, $R^2$, $R^3$, $R^4$, $R^5$, $R^6$, $R^7$, $R^8$ and $R^9$ each being a member selected from the group consisting of H, CH$_3$, C$_2$H$_5$, Cl, NH$_2$, OH and OCH$_3$; and M represents a base selected from Na, K, Li, NH$_4$, and amine salt cations.

2. The recording liquid of claim 1, wherein the dye represented by the general formula (B) is contained in an amount of 0.1–20% by weight based on the entire weight of the recording liquid.

* * * * *

UNITED STATES PATENT AND TRADEMARK OFFICE
CERTIFICATE OF CORRECTION

PATENT NO. : 4,557,761
DATED : December 10, 1985
INVENTOR(S) : MASATSUNE KOBAYASHI, ET AL.

It is certified that error appears in the above-identified patent and that said Letters Patent is hereby corrected as shown below:

Abstract, four lines from the bottom, before "$R^7$, $R^8$ and $R^9$" insert --$R^1$, $R^2$, $R^3$, $R^4$, $R^5$, $R^6$,--

Column 1, line 24, change "is" to --are--

Column 1, line 24, change "regorous" to --rigorous--

Column 1, line 68, change "cross-section" to --cross-sectional--

Column 12, line 44, change "$SO_3Na$" to --$SO_3NH_4$--

Column 25, line 34, change "which;" to --which--

Column 27, line 12, change "thorough" to --thoroughly--.

Signed and Sealed this

Twenty-fourth Day of February, 1987

Attest:

DONALD J. QUIGG

*Attesting Officer*  *Commissioner of Patents and Trademarks*